May 31, 1960 M. W. LEE 2,938,674
GARBAGE FEEDING DEVICE
Filed Jan. 16, 1956 2 Sheets-Sheet 2
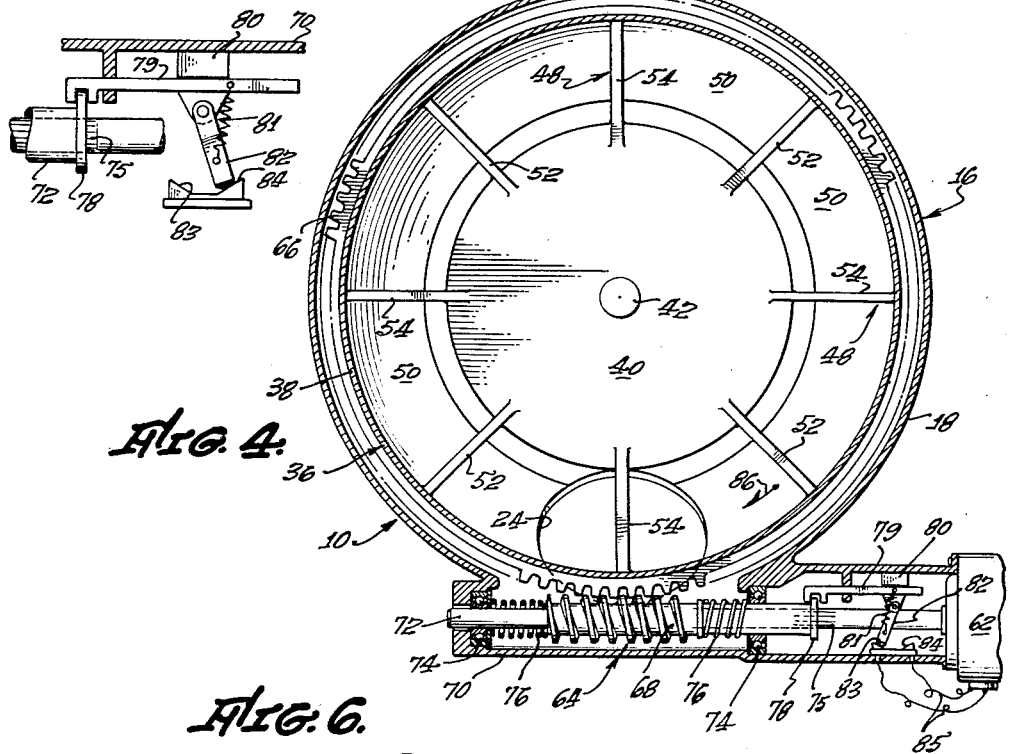
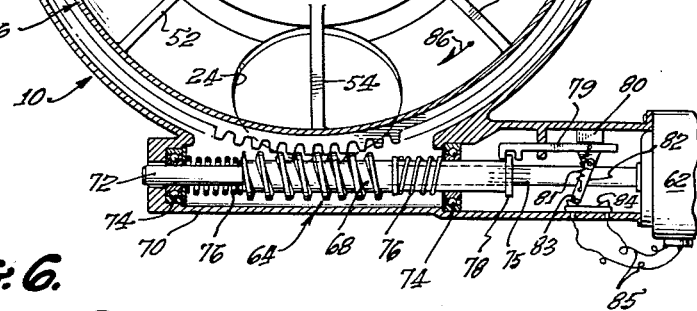
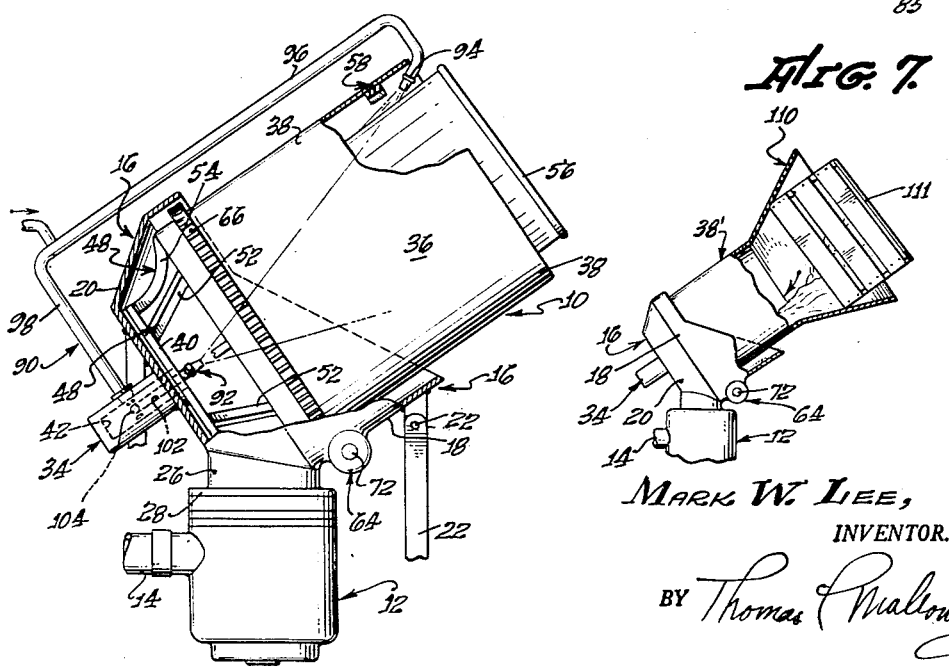
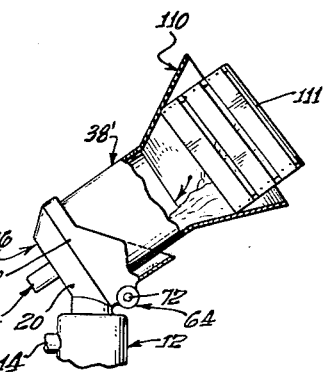
MARK W. LEE,
INVENTOR.
BY Thomas Malloney
ATTORNEY.

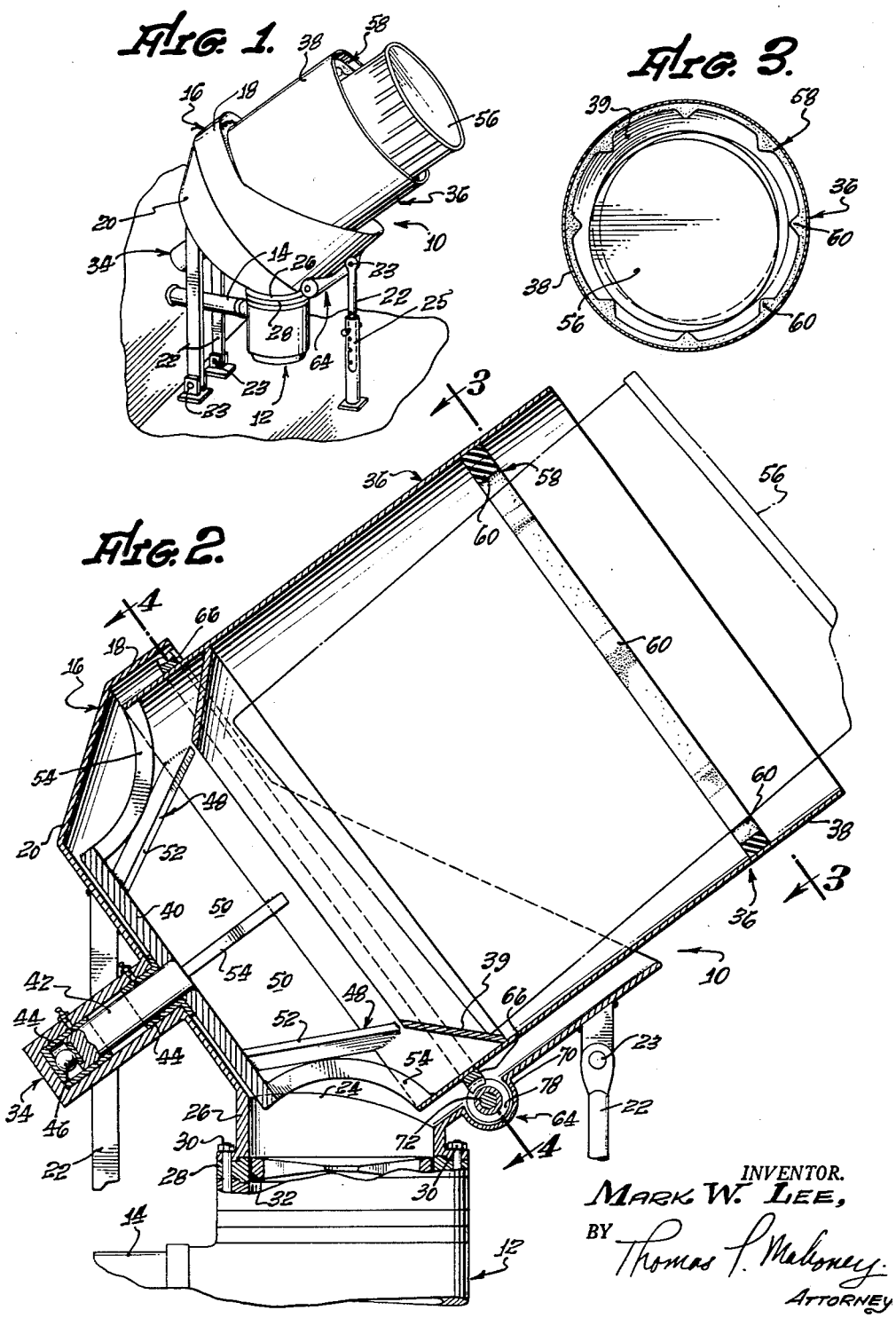

United States Patent Office 2,938,674
Patented May 31, 1960

2,938,674

GARBAGE FEEDING DEVICE

Mark W. Lee, 260 St. Albans Ave., South Pasadena, Calif.

Filed Jan. 16, 1956, Ser. No. 559,223

3 Claims. (Cl. 241—32)

This invention relates to a refuse feeding device and, more particularly, to a refuse feeding device which is adapted to be utilized in conjunction with a refuse and waste disposal device so that large quantities of waste and refuse may be automatically fed into the waste and refuse disposal device associated therewith.

As is well known to those skilled in the art, the problem of waste and refuse disposal is a considerable one in food preparation establishments such as restaurants, hotels, institutions, and the like, and poses serious questions of sanitation resulting from the accumulation of large quantities of garbage and other refuse during the periods of time between which scavengers can arrive to collect the same. Moreover, such refuse and waste must be stored in containers and thus the problem of the interim storage thereof between the filling of the containers and the ultimate collection thereof by scavengers is a vexing problem.

In order to overcome this difficulty, food preparation establishments and the like have been installing waste disposal units which are mounted in direct connection with the sewer lines and which are adapted to comminute and grind the waste resulting from food preparation and from other processes. For instance, in the canning industry, a tremendous problem arises out of the disposal of the large volume of waste resulting from the preparation of various types of food for canning and this problem has been solved, in part, by the utilization of waste disposal units built for industrial utilization.

However, only a portion of the above discussed problem has been solved by the utilization of waste disposal units since it is necessary to feed these disposal units by hand and to accumulate the waste products in containers whence they are dumped into receptacles connected to the waste disposal unit so that the refuse may be pushed or otherwise propelled into the inlet openings of the waste disposal units. Naturally, this involves a considerable expenditure of time and labor and is a fundamentally unsatisfactory way of solving the problem.

It is, therefore, an object of my invention to provide a refuse feeding device which is adapted to be utilized in conjunction with a waste disposal unit of conventional character and which includes a receptacle adapted for the reception of the refuse and waste to be disposed of which is mounted adjacent the inlet opening of a waste disposal device and which is provided with means for energizing said receptacle so that the waste deposited therein will be progressively fed into the inlet opening of the disposal device.

The waste products from various food preparation processes are frequently bulky, fibrous, and resistant to the comminuting action of the conventional waste disposal unit and it is frequently necessary to partially prepare the waste to be disposed of by hand prior to the feeding of the same into the inlet opening of such waste disposal units.

An additional object of my invention is the provision of a refuse feeding device which includes means adapted to perform a preliminary treatment on the waste deposited therein so that bulky, fibrous, and hard materials can be reduced to a size and condition which will warrant their being fed into the inlet opening of a waste disposal unit with which the refuse feeding device is utilized.

Another object of my invention is the provision of a refuse feeding device which is adapted for the reception of containers, such as garbage cans, ordinarily utilized for the reception and storage of waste and which has provided therein means for agitating and tumbling said containers so that the discharge of waste from said containers will be expeditious and efficient.

A further object of my invention is the provision of a refuse feeding device of the aforementioned character which includes a motor connected to the refuse receptacle to cause the movement of the same, said motor being connected to said receptacle by a drive system which incorporates over-ride means for automatically deenergizing or reversing the motor when waste becomes wedged between the inlet opening of the waste disposal unit and the preliminary treating means incorporated in the refuse feeding means of my invention.

An additional object of my invention is the provision, in conjunction with a device of the aforementioned character, of a fluid supply which is intended to feed and spray fluid, such as water, into the interior of the receptacle incorporated in the device and externally over the periphery of a container containing refuse disposed in said receptacle.

A further object of my invention is the provision of a refuse feeding device which is adapted for the reception of square or irregularly shaped containers and which incorporates means whereby the containers will be adequately supported within the rotatable receptacle.

A further object of my invention is the provision of a device of the aforementioned character which is bodily movable in order that the axis of inclination thereof may be altered to accommodate refuse of different consistencies and to insure that highly liquid material will be caused to flow freely through the receptacle incorporated in the device of my invention.

Other objects and advantages of my invention will be apparent from the following specification and the accompanying drawings which are for the purpose of illustration only and in which:

Fig. 1 is a perspective view showing the refuse feeding device of my invention mounted in conjunction with a waste disposal unit of conventional construction;

Fig. 2 is a vertical, partly sectional view;

Fig. 3 is a transverse, cross-sectional view taken on the broken line 3—3 of Fig. 2;

Fig. 4 is a transverse, sectional view taken on the broken line 4—4 of Fig. 2;

Fig. 5 is an enlarged, fragmentary view showing a portion of the over-ride means incorporated in the receptacle drive;

Fig. 6 is a side elevational view showing the refuse feeding device of my invention equipped with means for feeding fluid such as water to the interior of the receptacle incorporated in the same; and Fig. 7 is a view showing an alternative construction of the rotatable receptacle incorporated in the device of my invention.

Referring to the drawings and particularly to Figs. 1–2 thereof, I show a refuse feeding device 10 constructed in accordance with the teachings of my invention and operatively connected to a waste disposal unit 12 of conventional construction. Since the waste disposal unit 12 does not constitute a part of my invention, only those aspects thereof which are relevant to the operation of the refuse feeding device 10 will be discussed hereinbelow.

The waste disposal unit 12 is operatively connected by means of a flexible drain pipe 14 to the sewer line, not shown, of the establishment in which it is located. The refuse feeding device 10 includes an angularly oriented mount or housing 16 which is constituted by an upwardly opening shell member 18 having a frusto-conical base portion 20 which is mounted upon legs 22 at the desired angle of inclination to the vertical. The optimum angle of inclination to the vertical is determined by the angle at which the waste material will flow most readily toward the base portion 20 of the housing 16, but I have discovered that the most feasible range lies between 30° and 45° from the vertical. If the angle is smaller or greater, the refuse will tend to pack or be resistant to flow toward the base portion 20 of the housing 16.

The legs 22 can be provided with pivot points, as at 23, and the front leg 22 may incorporate an expansion joint 25 so that the base portion 20 of the housing 16 can be tilted to a desired angle so that refuse of different degrees of fluidity or viscosity can readily be accommodated. Thus the tendency of refuse to be resistant to flow toward the base portion 20 of the housing 16 can be overcome by increasing the angle of the housing by adjusting the expansion joint 25 on the leg 22 or, if the flow of refuse toward the base portion 20 of the housing should be excessive, the angle can be decreased by corresponding adjustment of the expansion joint 25 in the leg 22.

The housing 16 is provided with an outlet opening 24 for the passage of refuse therefrom in the lower left-hand corner thereof, as best shown in Fig. 2 of the drawings, said outlet opening being defined by an integral, cylindrical protrusion 26 which terminates in a radial flange 28 securable by means of bolts 30 to the upper extremity of the disposal unit 12. By this expedient, the outlet opening 24 of the housing 16 is juxtaposed to the inlet opening 32 of the disposal unit to permit the passage of refuse from the refuse feeding device 10 into the inlet opening 32 of said unit.

Centrally located in the base of the housing 16 and protruding angularly therefrom is a cylindrical boss 34 which is adapted to mount a refuse feeder 36 constituted by a drum 38 for rotation in the housing 16, in a manner to be described in greater detail below.

The drum 38 includes a base plate 40 of circular configuration which is mounted for rotation on a stub shaft 42 located and journaled in bushings 44 seated in the interior of the cylindrical protrusion 34. The lower extremity of the stub shaft 42 is engaged by a thrust bearing 46 to support the axial loads to which said shaft is subjected.

The drum 38 of the refuse feeder 36 is operatively connected to the base plate 40 by a plurality of bars 48 which space the lower edge of the drum 38 from the base plate 40 and thus define a plurality of outlet openings 50 which communicate successively with the outlet opening 24 in the base portion 20 of the housing 16. The bars 48 are formed from plow steel, or the like, and with straight bars 52 interspersed between arcuately formed bars 54, as best shown in Figs. 2 and 6 of the drawings. Therefore, as the refuse feeder 36 is rotated in the housing 16, the openings 50 defined by the bars 48 are successively registered with the outlet opening 24 and the straight bars 52 serve as preliminary treatment means for the refuse whereby larger components thereof are partially broken up by the wiping action of the bars 52 with relationship to the outlet opening 24 of the housing 16.

On the other hand, the arcuately configured bars 54 clear the outlet opening 24 of the housing 16 by a substantial margin, thus permitting these bars to assist in agitating the refuse deposited in the drum 38 and also to create a greater clearance with the outlet opening 24 of the housing 16. Located in the drum 38 is a frusto- conical baffle 39 upon which the lower extremity of a refuse can 56 can rest.

The drum 38 is of sufficient diameter to receive a refuse can 56 of conventional construction and there is provided upon the interior of said drum tumbling means 58 constituted in the present embodiment of the invention by an annular ring formed from steel, hard rubber, or the like, and being provided with a plurality of radial projections 60 upon the interior surface thereof, said projections being engageable with the periphery of the can 56 and being adapted to tumble the same so that refuse disposed therein will be agitated and thus caused to flow downwardly toward the outlet opening 24 of the housing 16 and through the successive openings 50 in the bottom of the refuse feeder 36.

The refuse feeder 36 is rotatable by means of a drive motor 62, said drive motor being operatively connected with the drum 38 by means of a drive 64, said drive including a ring gear 66 secured to the periphery of the drum 38 and operatively engageable by a worm 68 mounted on a housing 70 provided on the housing 16 of the refuse feeding device 10. The worm 68 is mounted for both rotary and longitudinal movement with a shaft 72 which has its opposite extremities journaled in bearings 74 and which is biased by means of compression springs 76 into a central position in the housing 70.

As best shown in Figs. 4 and 5 of the drawings, a splined connection 75 is provided between the shaft of the driving motor 62, which is a three-phase, reversing type motor, to permit longitudinal movement of the shaft 72 with reference to the shaft of the motor 62. A collar 78 is provided upon the shaft 72 and is engageable by a longitudinally shiftable bar 79 mounted in a bearing 80. Connected to the bar 79 by means of a spring 81 is a toggle-type switch arm 82 which is alternatively engageable with forward and reversing contacts 83 and 84, respectively, and which are, in turn, connected by leads 85 to the motor 62. While the contacts 83 and 84 are shown schematically as formed in one piece, it is to be understood that they are electrically isolated from each other by suitable insulating means, or the like.

Therefore, should refuse become wedged between the pre-comminuting bars 48 and the outlet opening 24 of the housing 16 of the refuse feeding device 10 and jam the drum 38 against rotation, the ring gear 66 will cease to rotate and the worm 68 would normally be also locked against rotation. However, since the worm 68 is longitudinally movable in conjunction with the shaft 72, relative longitudinal movement between the worm and the mobile ring gear 66 will take place so that the collar 78 will longitudinally shift the arm 79 in the same direction as the shaft 72 is moving to cause the toggle switch arm 82 to be moved by the spring 81 to the contact opposite that which is presently engaged by it and to reverse the electric motor 62.

Reversing of the motor 62 will reverse the direction of rotation of the ring gear 66 and thus remove the pre-comminuting bar 48 from engagement with the refuse lodged thereagainst, thus freeing the obstruction and permitting rotation of the drum 38. Reversing the motor 62 will also permit the springs 76 to return the shaft 72 to the central position.

In order to facilitate the movement of refuse from the interior of the can 56 disposed in the drum 38 and to simultaneously cleanse the exterior and interior of said can, there is provided in conjunction with the refuse feeding device 10 flushing means 90, best shown in Fig. 6 of the drawings, said flushing means including a centrally located spray nozzle 92 adapted to feed a spray of fluid, such as water, upwardly into the interior of the can 56 and a spray 94 located at the outer end of the drum and adapted to cleanse the exterior of the can 56 and to provide additional flushing fluid for inducing flow of the refuse from the bottom of the housing 16 through the outlet opening 24 thereof.

The spray 94 is connected by means of a supply pipe 96 to a source of water and a supply pipe 98 communicates with the cylindrical boss 34 on the housing base 20. The stub shaft 42 is provided with a centrally located bore 102 in fluid communication with the centrally located nozzle 92 and at its opposite end with the supply pipe 98 through a plurality of radial ports 104.

Therefore, as the drum 38 rotates, a continuous flow of water or other fluid is fed upwardly into the interior of the drum and the can 56 by means of the spray head 92 and a downward flow of water or other fluid washing over the exterior of the can 56 is obtained by the use of the spray head 94. Of course, while I have arbitrarily shown only two spray heads, it is conceivable that a number of other heads located at strategic places in the interior of the refuse feeding device 10 will materially augment the flow of refuse through the outlet opening 24 of the housing 16.

In utilizing the refuse feeding device 10, a can 56 of refuse is placed in the drum 38 in inverted position and rotation of the drum 38 in the housing 16 by energization of the reversible electric motor 62 is initiated simultaneously with the energization of the disposal unit 12. Moreover, the valve, not shown, controlling flow of fluid to the spray heads 92 and 94 is opened to cause the flow of water or other fluid through said spray heads into the interior of the drum 38 and the can 56. The rotation of the drum 38 will cause limited rotation of the can 56 and the tumbling means 58 will shake and vibrate the can 56 to cause the downward flow and dislodgement of refuse therefrom.

As the mechanical tumbling action causes the downward movement of the refuse from the can 56, said movement will be augmented by the jet of fluid from the nozzles 92 and 94 until the fluid reaches the successive openings 50 defined between the bars 48. The bars 48 and particularly the arcuately configured bars 54 will stir and agitate the refuse and will, when the refuse is engaged between the peripheral edge of the outlet opening 24 of the housing 16 and bar 48, partially comminute and reduce the mass of refuse to a size which will facilitate its passage into the inlet opening 32 of the disposal unit 12. Thus, fibrous refuse such as lettuce, celery, and the like, is broken or torn by the action of the bars with relationship to the peripheral edge of the outlet opening 24 into smaller segments and large sized refuse such as bones and similar material can be broken into smaller sizes by the chopping action of the bars 48.

However, the automatic reversal of the motor 62 accomplished when there is an accumulation of refuse between a bar 48 and the peripheral edge of the outlet opening 24 sufficient to prevent rotation of the drum 38 will release the bar 48 involved in the jam or accumulation so that said accumulation may be automatically cleared, if possible, and reverse rotation of the drum 38 resumed. The provision of the spray heads 92 and 94 assists in washing the refuse through the outlet opening 24 of the housing 16 and into the inlet opening 32 of the disposal unit 12, while the tumbling means constituted by the annular ring 58 is a factor in achieving expeditious and complete downward flow of refuse from the interior of the can 56.

An alternative embodiment of the invention is shown in Fig. 7 of the drawings wherein there is illustrated a rotatable drum 38' which is provided with a tetra-pyramidal extension 110 for receiving a container 111, such as a vegetable crate or the like, inserted therein. It will be noted that the walls of the extension 110 are angularly inclined from the mouth thereof inwardly so that no matter what the over-all size of the container 111 may be it will ultimately bottom on the angularly inclined walls 110 and be located securely therein so that it will rotate therewith.

I thus provide by my invention a refuse feeding device which is characterized by its automatic operation and the facility with which large quantities of refuse can be handled. The use of the refuse feeding device of my invention in conjunction with a convenitional disposal unit eliminates the necessity for the handling in a manual procedure of large quantities of waste and refuse.

I claim as my invention:

1. In a device for feeding refuse into the inlet of a disposal unit, the combination of: a support; a rotatable feeder drum mounted in said support and having an inlet at one end and an outlet at the other end adjacent said disposal inlet; a motor connected to said drum for rotating the same; comminuting means at said drum outlet for pretreating refuse prior to its being fed into said disposal inlet; and clutch means interposed between said motor and said drum to automatically reverse the direction of rotation of said drum upon the wedging of refuse at said drum outlet.

2. In a refuse feeding device for feeding refuse into the inlet of a refuse disposal unit, the combination of: a support; a rotatable receptacle mounted on said support upon an inclined axis, said receptacle having an outlet juxtaposed to said disposal inlet; comminuting means disposed at said receptacle outlet for pretreating said refuse prior to its reception in said disposal inlet; a motor operatively connected to said receptacle for rotating the same upon said support; and release means interposed in the operative connection between said motor and said receptacle whereby resistance to the rotation of said container occasioned by the jamming of refuse in said comminuting means will cause said operative connection to be automatically and temporarily rendered inoperative.

3. In a refuse feeding device for feeding refuse into the inlet of a refuse disposal unit, the combination of: a support; a rotatable receptacle mounted on said support upon an inclined axis, said receptacle having an outlet juxtaposed to said disposal inlet; fluid applying means in said receptacle for washing refuse therefrom; a motor operatively connected to said receptacle for rotating the same upon said support; and release means interposed in the operative connection between said motor and said receptacle whereby resistance to the rotation of said container occasioned by the jamming of refuse in said receptacle outlet will cause said operative connection to be automatically and temporarily rendered inoperative.

References Cited in the file of this patent

UNITED STATES PATENTS

| | | |
|---|---|---|
| 1,342,456 | Nagel | June 8, 1920 |
| 1,684,128 | Edelmann | Sept. 11, 1928 |
| 2,264,039 | Hoya | Nov. 25, 1941 |
| 2,341,105 | Kueneman et al. | Feb. 8, 1944 |
| 2,467,278 | Thompson | Apr. 12, 1949 |
| 2,505,674 | Knight | Apr. 25, 1950 |
| 2,594,974 | Mylting | Apr. 29, 1952 |
| 2,615,636 | Powers | Oct. 28, 1952 |
| 2,629,558 | Miller | Feb. 24, 1953 |
| 2,667,308 | Hammes | Jan. 26, 1954 |
| 2,753,121 | Elfenbein | July 3, 1956 |
| 2,846,153 | Krogh | Aug. 5, 1958 |